(12) United States Patent
Kuroda

(10) Patent No.: US 11,694,833 B2
(45) Date of Patent: Jul. 4, 2023

(54) INDUCTOR COMPONENT AND DC/DC CONVERTER USING THE SAME

(71) Applicant: TDK Corporation, Tokyo (JP)

(72) Inventor: Tomofumi Kuroda, Tokyo (JP)

(73) Assignee: TDK CORPORATION, Tokyo (JP)

(*) Notice: Subject to any disclaimer, the term of this patent is extended or adjusted under 35 U.S.C. 154(b) by 37 days.

(21) Appl. No.: 17/375,492

(22) Filed: Jul. 14, 2021

(65) Prior Publication Data

US 2022/0037073 A1 Feb. 3, 2022

(30) Foreign Application Priority Data

Jul. 31, 2020 (JP) ................................ 2020-129856

(51) Int. Cl.
*H01F 27/25* (2006.01)
*H01F 27/28* (2006.01)
*H02M 3/155* (2006.01)

(52) U.S. Cl.
CPC ............. *H01F 27/25* (2013.01); *H01F 27/28* (2013.01); *H02M 3/155* (2013.01)

(58) Field of Classification Search
CPC ......... H01F 27/25; H01F 27/28; H02M 3/155
See application file for complete search history.

(56) References Cited

U.S. PATENT DOCUMENTS 9,343,210 B2 * 5/2016 Adar ..................... H01F 3/04
9,570,535 B2 * 2/2017 Ouyang ................ H01F 38/00
2016/0307686 A1 10/2016 Moon et al.

FOREIGN PATENT DOCUMENTS

JP 2019-212806 A 12/2019

* cited by examiner

*Primary Examiner* — Adolf D Berhane
(74) *Attorney, Agent, or Firm* — McDermott Will & Emery LLP

(57) ABSTRACT

Disclosed herein is an inductor component that includes a magnetic core having magnetic thin ribbons laminated in a z-direction, a first coil conductor inserted into first and second through holes penetrating the magnetic core in the z-direction, and a second coil conductor inserted into third and fourth through holes penetrating the magnetic core in the z-direction. Each of the magnetic thin ribbons is divided into a plurality of small pieces by net-shaped cracks. A periphery of each of the first to fourth through holes is surrounded by the plurality of small pieces without being circumferentially divided by a slit having a size larger than the crack.

12 Claims, 7 Drawing Sheets

INDUCTOR COMPONENT AND DC/DC CONVERTER USING THE SAME

BACKGROUND

Field

The present disclosure relates to an inductor component and a DC/DC converter using the same and, more particularly, to an inductor component having two coil conductors inserted into through holes formed in a magnetic core and a DC/DC converter using such an inductor component.

Description of Related Art

As an inductor component having two coil conductors inserted into through holes formed in a magnetic core, an inductor component described in JP 2019-212806A is known. In the inductor component described in JP 2019-212806A, a slit is formed in the magnetic core so as to divide the periphery of the through hole in the circumferential direction to thereby reduce the coupling coefficient between the two coil conductors.

However, forming the slit in the magnetic core disadvantageously reduces the value of inductance. It is not easy to accurately control the width of the slit during processing, and the inductance value significantly depends on the slit width, so that the inductance value is apt to vary.

SUMMARY

It is therefore an object of the present disclosure to reduce a decrease and a variation in the inductance value in an inductor component having two coil conductors inserted into through holes formed in a magnetic core. Another object of the present disclosure is to provide a DC/DC converter using such an inductor component.

An inductor component according to the present disclosure includes: a magnetic core having a plurality of magnetic thin ribbons extending in first and second directions perpendicular to each other and laminated in a third direction perpendicular to the first and second directions; a first coil conductor inserted into first and second through holes penetrating the magnetic core in the third direction; and a second coil conductor inserted into third and fourth through holes penetrating the magnetic core in the third direction. The first and second through holes are disposed symmetric with respect to a first center line passing, in the first direction, the center position of the magnetic core in the second direction. The third and fourth through holes are disposed symmetric with respect to the first center line. The first and third through holes are disposed symmetric with respect to a second center line passing, in the second direction, the center position of the magnetic core in the first direction. The second and fourth through holes are disposed symmetric with respect to the second center line. Each of the plurality of magnetic thin ribbons is divided into a plurality of small pieces by net-shaped cracks, and the periphery of each of the first to fourth through holes is surrounded by the plurality of small pieces without being circumferentially divided by a slit having a size larger than the crack.

BRIEF DESCRIPTION OF THE DRAWINGS

The above features and advantages of the present disclosure will be more apparent from the following description of certain preferred embodiments taken in conjunction with the accompanying drawings, in which.

DETAILED DESCRIPTION OF THE EMBODIMENTS

Preferred embodiments of the present disclosure will be explained below in detail with reference to the accompanying drawings.

Figure 1:
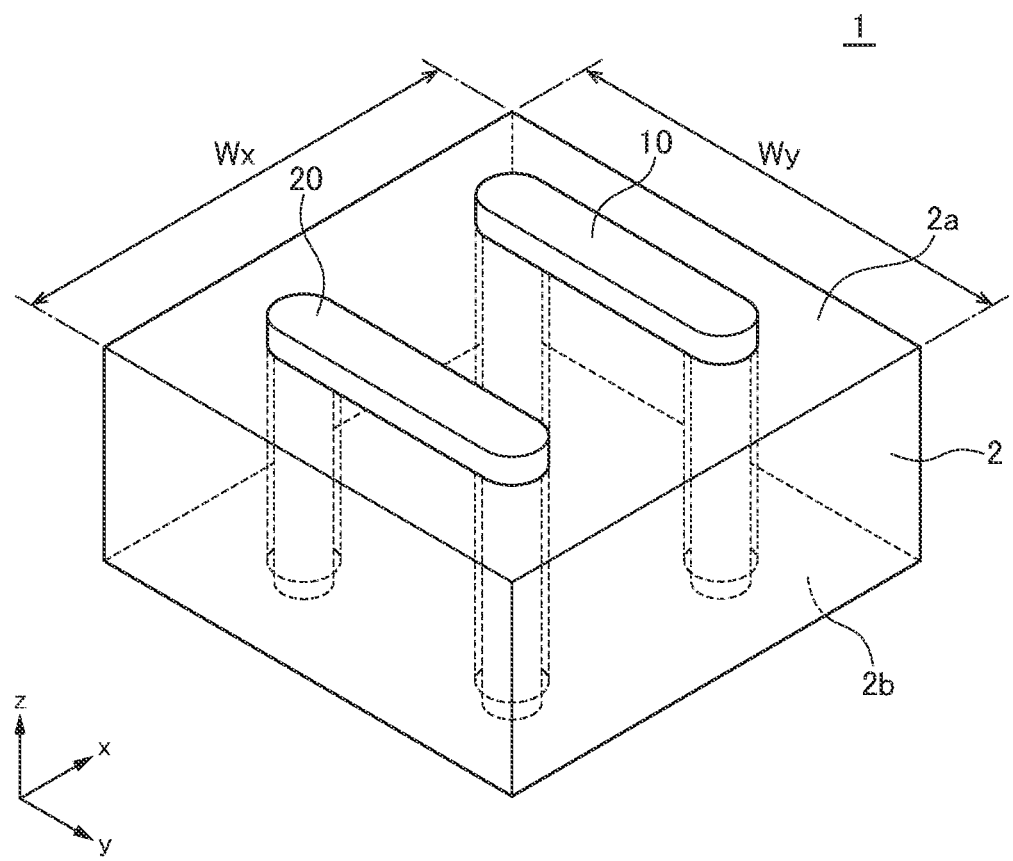
FIG. 1 is a schematic perspective view illustrating the outer appearance of an inductor component 1 according to an embodiment of the present disclosure.
Figure 2:
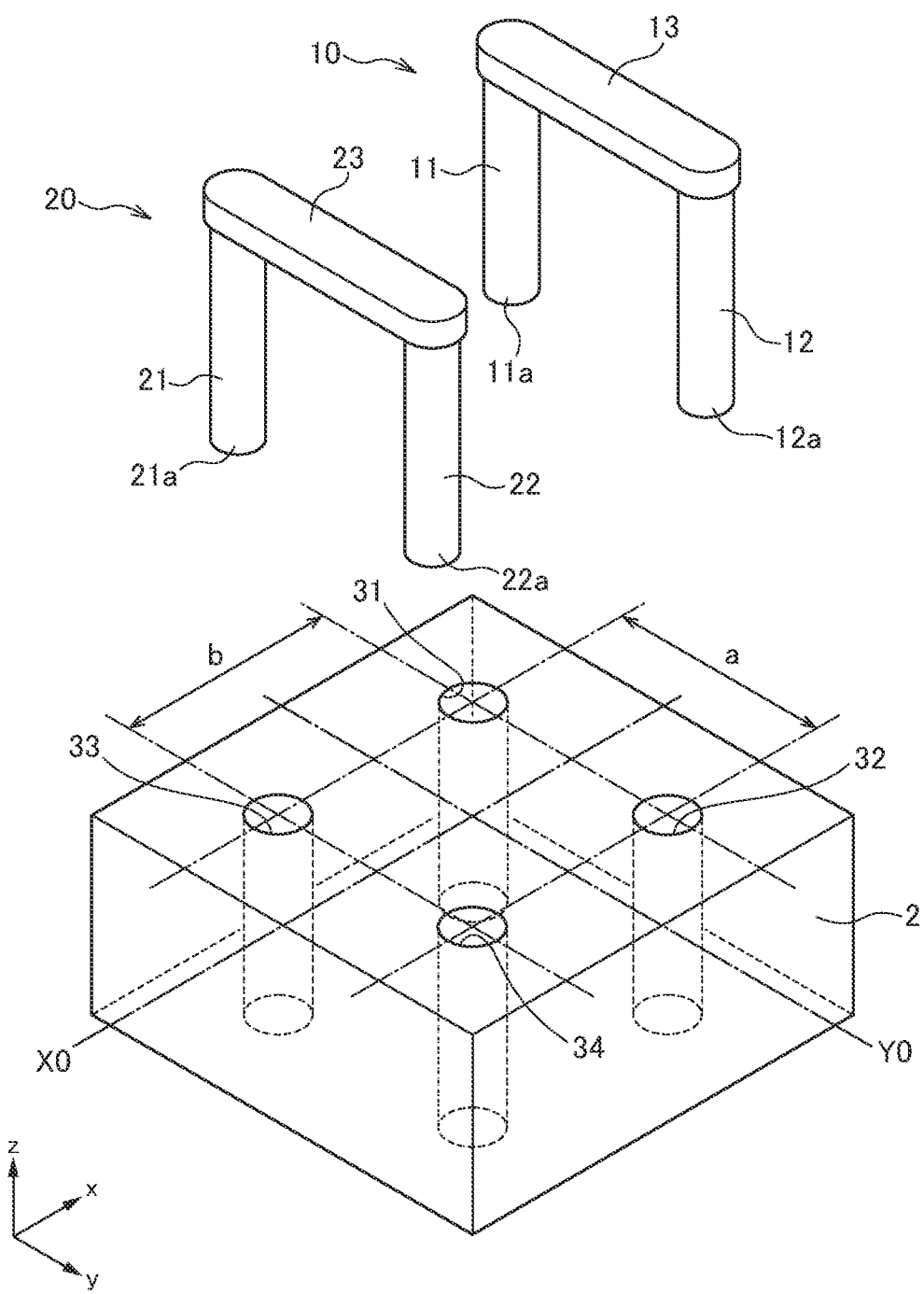
FIG. 2 is a schematic exploded perspective view of the inductor component 1.

FIG. 1 is a schematic perspective view illustrating the outer appearance of an inductor component 1 according to an embodiment of the present disclosure. FIG. 2 is a schematic exploded perspective view of the inductor component 1.

As illustrated in FIGS. 1 and 2, the inductor component 1 according to the present embodiment includes a magnetic core 2 having four through holes 31 to 34, a coil conductor 10 inserted into the through holes 31 and 32, and a coil conductor 20 inserted into the through holes 33 and 34. The magnetic core 2 has a substantially rectangular parallelepiped outer shape. The width of the magnetic core 2 in the x- and that in the y-directions are Wx and Wy, respectively. The through holes 31 to 34, each of which has a circular xy cross section, are formed to penetrate the magnetic core 2 in the z-direction. The magnetic core 2 has a configuration in which a plurality of magnetic thin ribbons extending in the xy direction are laminated in the z-direction with a non-magnetic material such as resin interposed therebetween. The coil conductors 10 and 20 are a good conductor such as copper (Cu).

The coil conductor 10 integrally includes an insertion part 11 inserted into the through hole 31, an insertion part 12 inserted into the through hole 32, and a connection part 13 positioned on the side of an upper surface 2a of the magnetic core 2 and connecting the insertion parts 11 and 12. Although the xy cross section of each of the insertion parts 11 and 12 is preferably a circular shape, it may be, for example, an elliptical shape. Further, although the xz cross section of the connection part 13 is preferably a substantially rectangular shape, it may be, for example, a rectangular shape. The cross-sectional area of each of the insertion parts 11 and 12 and that of the connection part 13 are preferably the same as each other. Leading ends 11a and 12a of the insertion parts 11 and 12 positioned on the side of a lower surface 2b of the magnetic core 2 protrude from the lower surface 2b. One of the protruding leading ends 11a and 12a serves as an input terminal, and the other thereof as an output terminal.

The coil conductor 20 integrally includes an insertion part 21 inserted into the through hole 33, an insertion part 22 inserted into the through hole 34, and a connection part 23 positioned on the side of the upper surface 2a of the magnetic core 2 and connecting the insertion parts 21 and 22. The cross-sectional area of each of the insertion parts 21 and 22 and that of the connection part 23 are preferably the same as each other. Although the xy cross section of each of the insertion parts 21 and 22 is preferably a circular shape, it may be, for example, an elliptical shape. Further, although the xz cross section of the connection part 23 is preferably a substantially rectangular shape, it may be, for example, a rectangular shape. Leading ends 21a and 22a of the insertion parts 21 and 22 positioned on the side of the lower surface 2b of the magnetic core 2 protrude from the lower surface 2b. One of the protruding leading ends 21a and 22a serves as an input terminal, and the other thereof as an output terminal.

As illustrated in FIG. 2, the through holes 31 and 32 are arranged in the y-direction and located at the same x-direction position. Similarly, the through holes 33 and 34 are arranged in the y-direction and located at the same x-direction position. The through holes 31 and 33 are arranged in the x-direction and located at the same y-direction position. Similarly, the through holes 32 and 34 are arranged in the x-direction and located at the same y-direction position.

When a center line XO passing the y-direction center position of the magnetic core 2 in the x-direction is assumed, the through holes 31 and 32 are disposed symmetric with respect to the center line XO, and the through holes 33 and 34 are disposed symmetric with respect to the center line XO. Further, when a center line YO passing the x-direction center position of the magnetic core 2 in the y-direction is assumed, the through holes 31 and 33 are disposed symmetric with respect to the center line YO, and the through holes 32 and 34 are disposed symmetric with respect to the center line YO. This makes coil conductors 10 and 20 substantially completely match each other in characteristics. The distance between the center of the through hole 31 and the center of the through hole 32 in the y-direction and that between the center of the through hole 33 and the center of the through hole 34 in the y-direction are each defined as a, and the distance between the center of the through hole 31 and the center of the through hole 33 in the x-direction and that between the center of the through hole 32 and the center of the through hole 34 in the x-direction are each defined as b.

Figure 3:
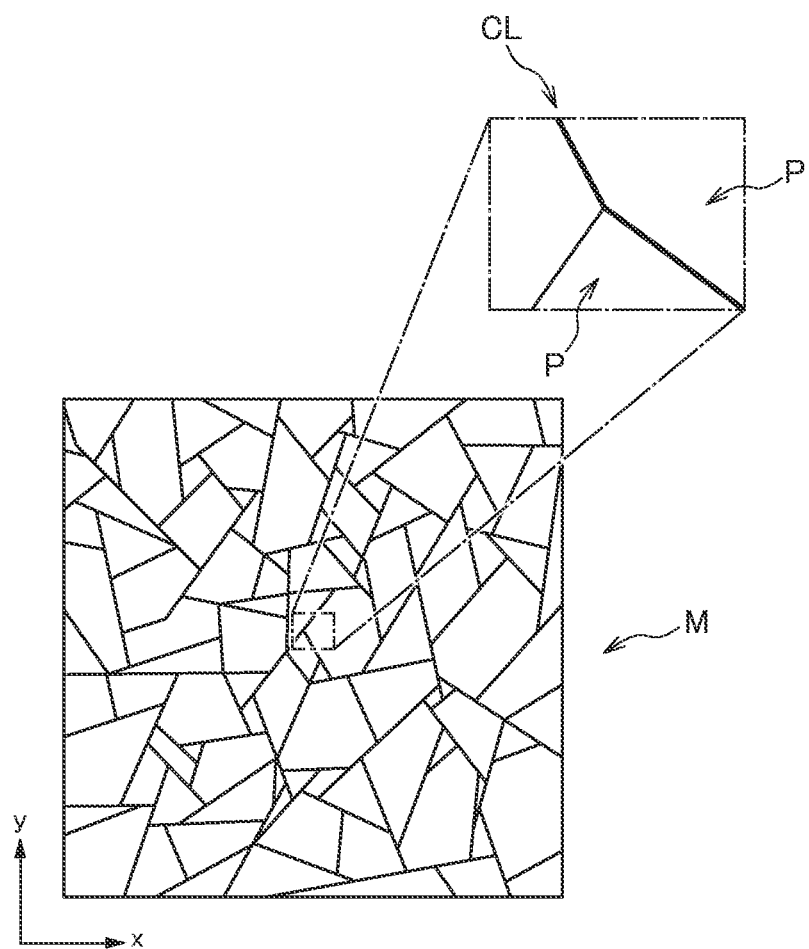
FIG. 3 is a view for explaining the structure of a magnetic thin ribbon M constituting the magnetic core 2.

FIG. 3 is a view for explaining the structure of a magnetic thin ribbon M constituting the magnetic core 2.

The magnetic thin ribbon M constituting the magnetic core 2 is made of a high permeability metal material such as an amorphous alloy or a nanocrystalline alloy and divided into a plurality of small pieces P by net-shaped cracks CL, as illustrated in FIG. 3. The cracks CL reduce the permeability of the magnetic thin ribbon M in the xy plane direction to prevent magnetic saturation of the inductor component 1. When the inductor component 1 is used for a DC/DC converter, the average interval between the cracks CL is preferably set to 15 μm or more and 1 mm or less, whereby the permeability of the magnetic thin ribbon M can be adjusted to an optimum value.

Figure 4:
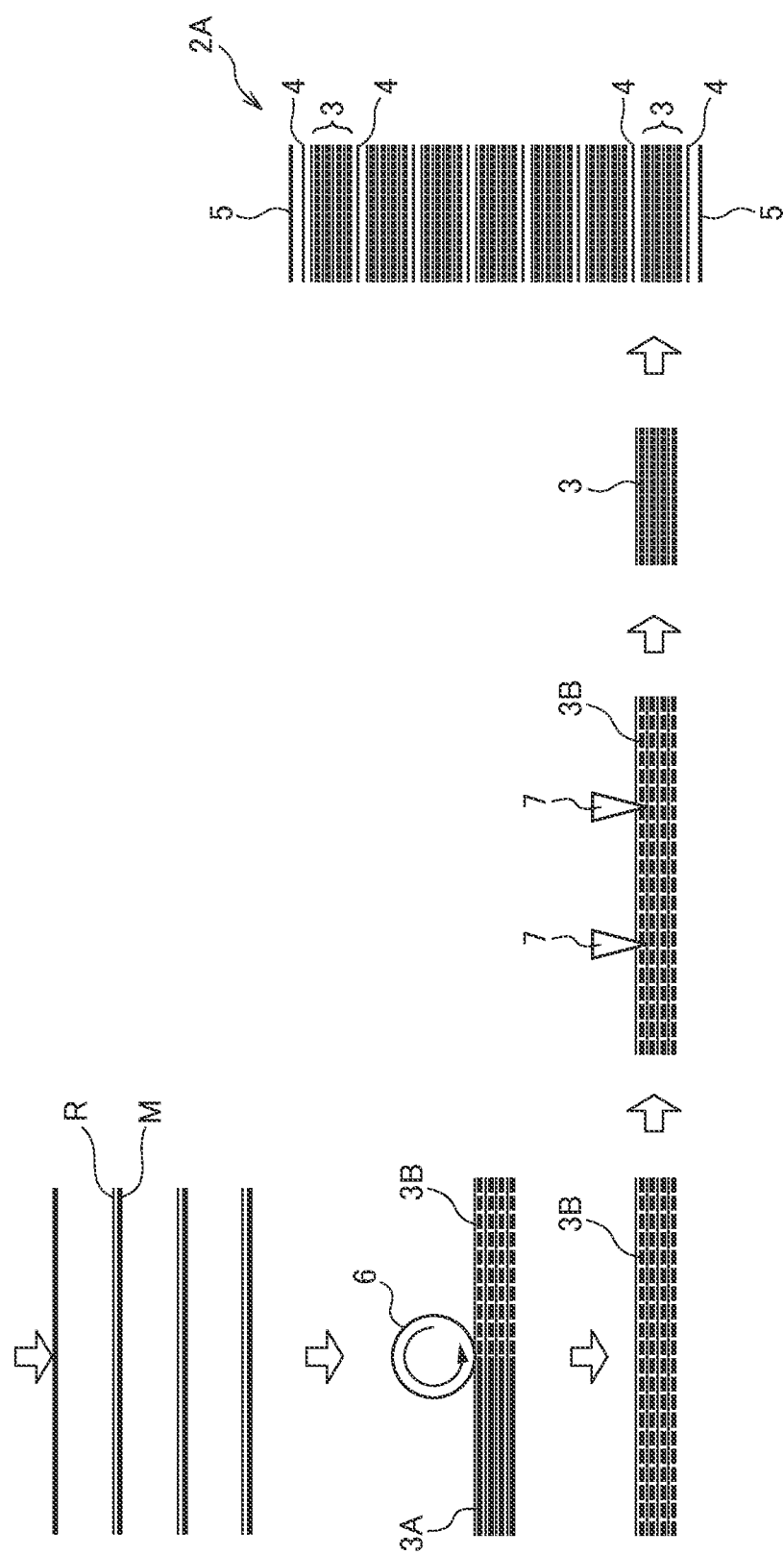
FIG. 4 is a schematic view for explaining a manufacturing method for the magnetic core 2.

FIG. 4 is a schematic view for explaining a manufacturing method for the magnetic core 2.

In manufacturing the magnetic core 2, first a plurality of (e.g., four) magnetic thin ribbons M are laminated with a non-magnetic material R such as resin interposed therebetween, followed by pressing for integration, whereby a magnetic sheet 3A is obtained. The thickness of the magnetic thin ribbon M is, e.g., about 20 μm, and the permeability thereof is, e.g., about 20000. Then, the magnetic sheet 3A is pressed with a roller 6 to form the cracks CL in the magnetic thin ribbons M constituting the magnetic sheet 3A. The average interval between the cracks CL and the size of the small pieces P obtained by the cracks CL can be adjusted by the diameter, pressing force, and pressing speed of the roller 6. As a result, a magnetic sheet 3B in which the magnetic thin ribbons M have been divided into small pieces by the cracks CL is obtained. Dividing the magnetic thin ribbon M into small pieces by the cracks CL reduces the permeability of the magnetic thin ribbon M to about 100 to 200, which is a value optimally applied to use for a DC/DC converter.

Then, a cutter 7 is used to cut the magnetic sheet 3B into the same planar size as that of the magnetic core 2 to obtain a plurality of unit magnetic cores 3, followed by lamination of the plurality of unit magnetic cores 3 with a non-magnetic material 4 such as resin interposed therebetween, and pressing, whereby a block-shaped magnetic core 2A is obtained. The upper and lower surfaces of the magnetic core 2A may be covered with a cover film 5 made of, e.g., PET resin. After that, the through holes 31 to 34 are formed in the magnetic core 2A through drilling, whereby the magnetic core 2 illustrated in FIGS. 1 and 2 is completed. Finally, the coil conductors 10 and 20 are inserted into the through holes 31 to 34. Thus, the inductor component 1 according to the present embodiment is completed.

As described above, the magnetic core 2 can be manufactured by laminating the magnetic thin ribbons M which have been divided into small pieces by the cracks CL and then forming the through holes 31 to 34. That is, the block-shaped magnetic core 2A is machined only for formation of the through holes 31 to 34 and need not be machined for formation of the slit for dividing a magnetic path. Thus, the periphery of each of the through holes 31 to 34 is entirely surrounded by the plurality of small pieces P without being circumferentially divided by the slit having a size larger than the crack CL, thereby preventing a decrease and a variation in the value of inductance due to the presence of the slit. Further, the non-magnetic material R or 4 is interposed between the magnetic thin ribbons M adjacent in the z-direction, so that there occurs almost no magnetic flux that flows in the z-direction. That is, there occurs little eddy current due to z-direction magnetic flux.

The inductance value of the coil conductors 10 and 20 and coupling coefficient between the coil conductors 10 and 20 depend on the planar size of the magnetic core 2 and positions of the through holes 31 to 34. It is generally believed that the coupling coefficient between the coil conductors 10 and 20 is preferably near zero; however, as will be described later, when the inductor component 1 is used as an inductor for a DC/DC converter, a variation in output voltage decreases in the presence of a certain level of coupling coefficient. Specifically, the coupling coefficient between the coil conductors 10 and 20 is preferably set to 0.03 to 0.2 and, more preferably, to 0.05 to 0.1.

Figure 5:
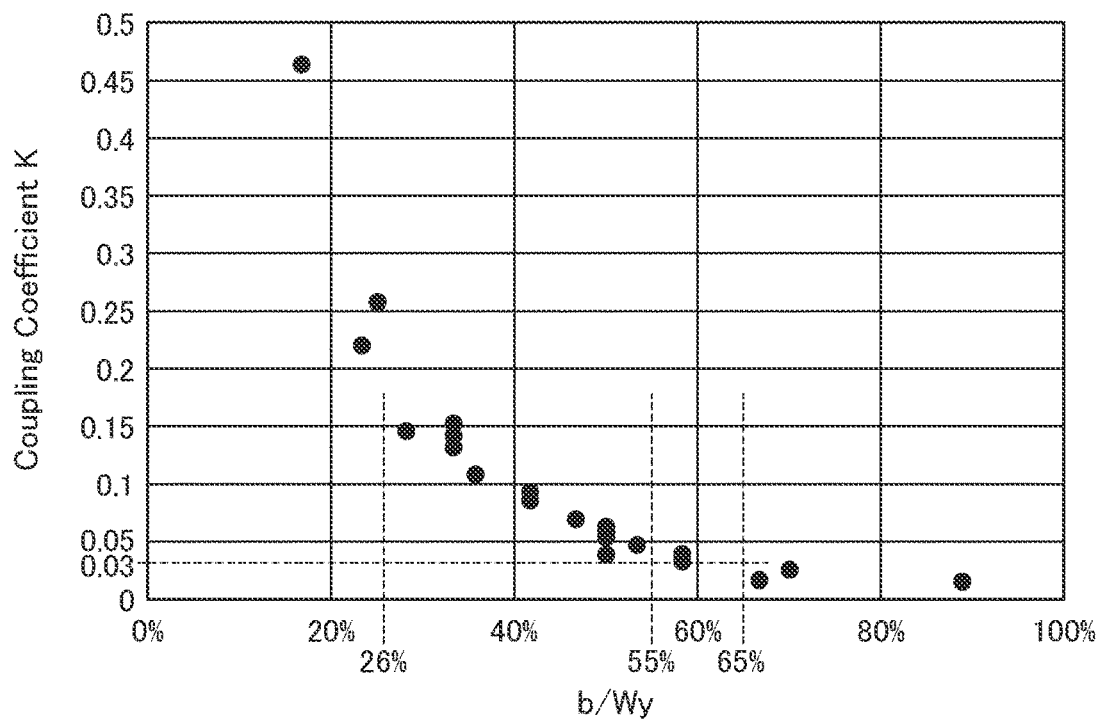
FIG. 5 is a simulation result indicating the relation between the width Wy of the magnetic core 2, a pitch b between the through holes 31 to 34, and a coupling coefficient k.

FIG. 5 is a simulation result indicating the relation between the width Wy of the magnetic core 2, a pitch b between the through holes 31 to 34, and a coupling coefficient k. In the simulation, the positions of the through holes 31 to 34 are changed with the widths Wx and Wy of the magnetic core 2 set to 6 mm, the thickness of the magnetic core 2 in the z-direction to 2.8 mm, the diameter of the through holes 31 to 34 to 0.7 mm, and the diameter of the insertion parts 11, 12, 21, and 22 to 0.6 mm. As illustrated in FIG. 5, the coupling coefficient k between the coil conductors 10 and 20 decreases as the value of b/Wy increases. The value of b/Wy at which the coupling coefficient k is in the range of 0.03 to 0.2 is 26% to 65%, and the value of b/Wy at which the coupling coefficient k is in the range of 0.05 to 0.1 is 40% to 55%.

Figure 6:
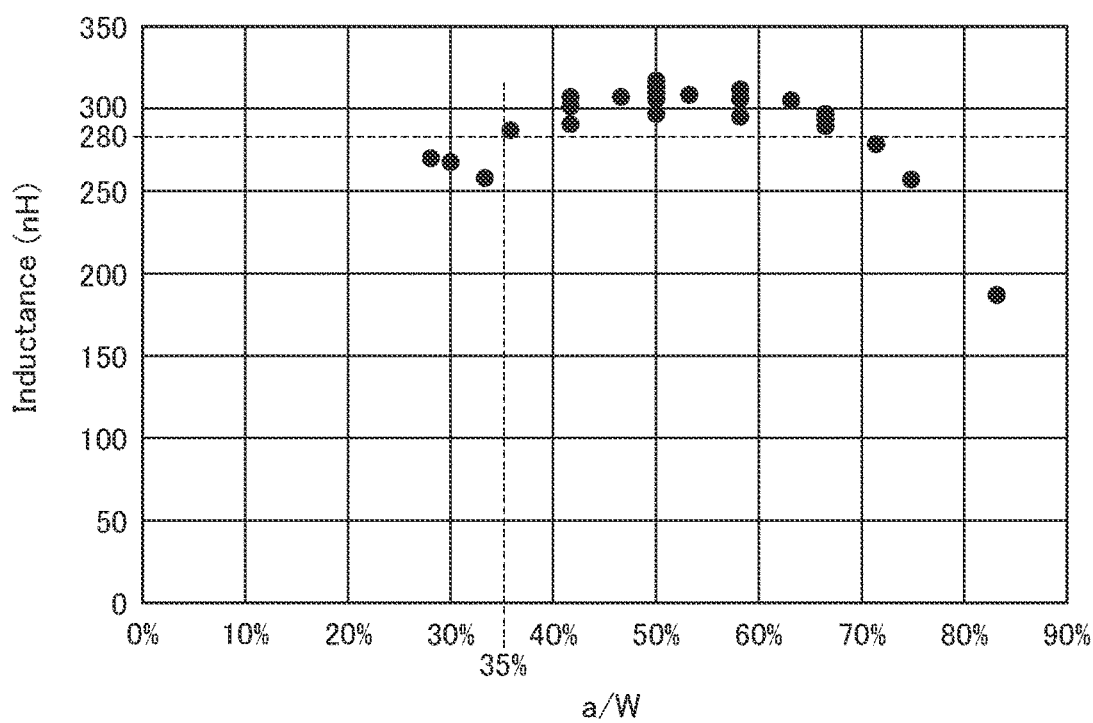
FIG. 6 is a simulation result indicating the relation between a width W, which is larger one of the widths Wx and Wy of the magnetic core 2 and an inductance value L.

FIG. 6 is a simulation result indicating the relation between a width W, which is larger one of the widths Wx and Wy of the magnetic core 2 and an inductance value L. In the simulation, as a basic setting, the widths Wx and Wy of the magnetic core 2 is set to 6 mm, the thickness of the magnetic core 2 in the z-direction is set to 2.8 mm, the diameter of the through holes 31 to 34 is set to 0.7 mm, and the diameter of the insertion parts 11, 12, 21, and 22 is set to 0.6 mm, and the values of Wx and Wy are changed while the sum or product of Wx and Wy is kept constant, or the positions of the through holes 31 to 34 are changed. As illustrated in FIG. 6, the inductance value L reaches a peak value when the value of a/W is 50% and becomes 280 nH when the value of a/W is in the range of 35% to 70%.

Figure 7:
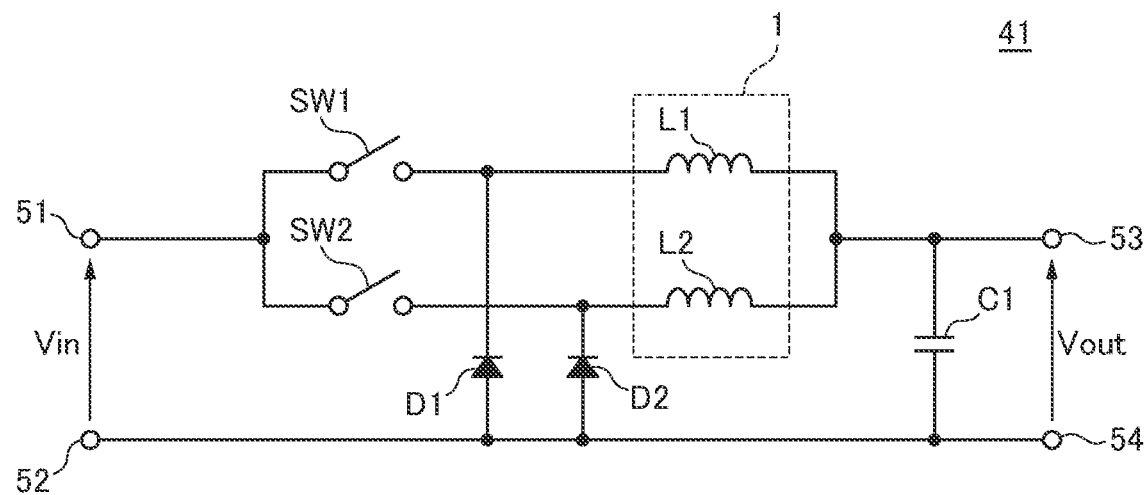
FIG. 7 is a circuit diagram of a DC/DC converter 41 as a first example using the inductor component 1.

FIG. 7 is a circuit diagram of a DC/DC converter 41 as a first example using the inductor component 1.

The DC/DC converter 41 illustrated in FIG. 7 has a pair of input terminals 51 and 52, a pair of output terminals 53 and 54, a switching transistor SW1 and an inductor L1 connected in series in this order between the input terminal 51 and the output terminal 53, a switching transistor SW2 and an inductor L2 connected in series in this order between the input terminal 51 and the output terminal 53, and a capacitor C1 connected between the output terminals 53 and 54. A circuit composed of the switching transistor SW1 and the inductor L1 and a circuit composed of the switching transistor SW2 and inductor L2 are connected in parallel between the input terminal 51 and the output terminal 53. The input terminal 52 and output terminal 54 constitute a ground line. A diode D1 is connected in a backward direction between the connection point between the switching transistor SW1 and the inductor L1 and the ground line, and a diode D2 is connected in a backward direction between the connection point between the switching transistor SW2 and the inductor L2 and the ground line.

The switching transistors SW1 and SW2 are alternately turned ON and OFF by a not-shown control circuit to generate an output voltage Vout which is obtained by lowering an input voltage Vin. The switching transistors SW1 and SW2 can be controlled such that the output voltage Vout is 20% or less of the input voltage Vin.

The inductor component 1 according to the present embodiment is used in the thus configured DC/DC converter 41 as the inductors L1 and L2. For example, the coil conductor 10 constitutes the inductor L1, and the coil conductor 20 constitutes the inductor L2. This allows a reduction in the number of components constituting the DC/DC converter 41.

Figure 8:
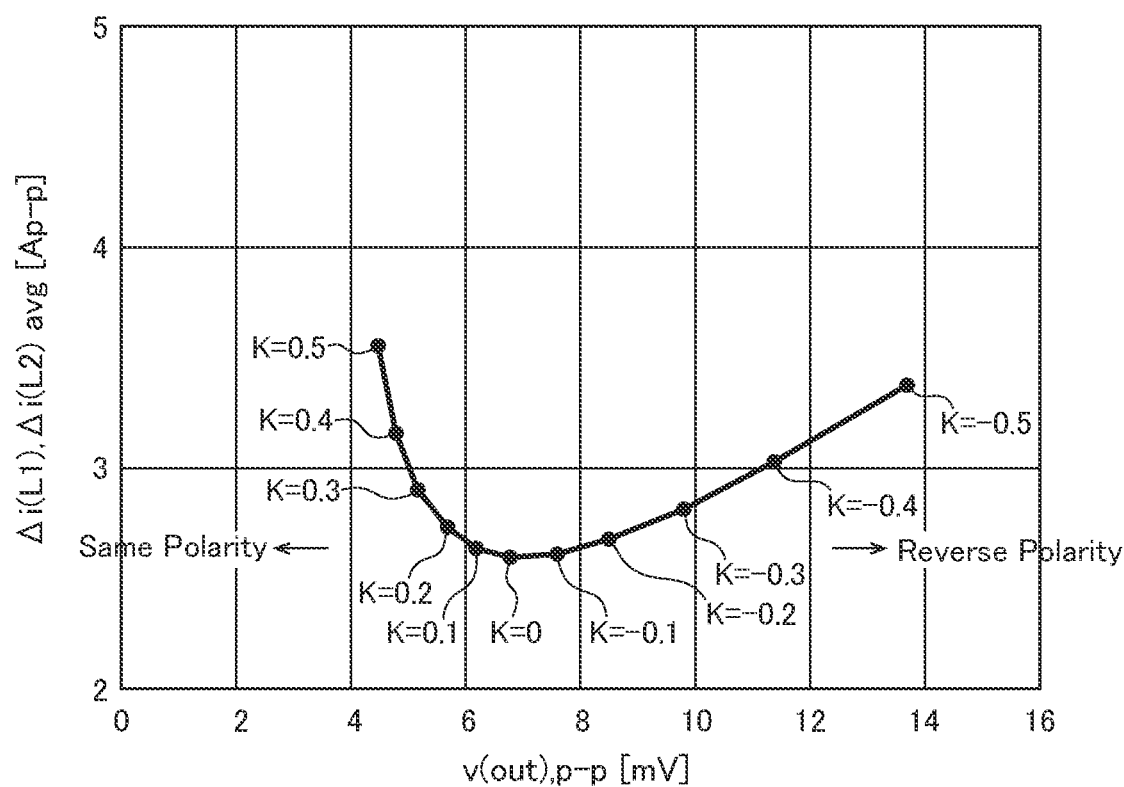
FIG. 8 is a graph illustrating the relation between parameters in the DC/DC converter 41, specifically, the coupling coefficient k between the coil conductors 10 and 20, a variation in the output voltage Vout, and ripple current flowing in the inductors L1 and L2.

FIG. 8 is a graph illustrating the relation between parameters in the DC/DC converter 41, specifically, the coupling coefficient k between the coil conductors 10 and 20, a variation in the output voltage Vout, and ripple current flowing in the inductors L1 and L2. Here, the output voltage Vout is set to 0.6 V, and the duty of the switching transistors SW1 and SW2 is set to 0.05. The variation in the output voltage Vout is a peak-to-peak value (mV). The value of the ripple current is an average value (Ap-p) between ripple current Δi (L1) flowing in the inductor L1 and ripple current Δi (L2) flowing in the inductor L2.

The graph of FIG. 8 reveals that the ripple current flowing in the inductors L1 and L2 becomes minimum when the coupling coefficient k is zero. However, the variation in the output voltage Vout decreases more when the coupling coefficient k increases in the positive direction than when the coupling coefficient k is zero. The ripple current increases when the coupling coefficient k increases in the positive direction, and an increase in the ripple current is sufficiently small when the coupling coefficient k is 0.2 or less and is substantially ignorable when the coupling coefficient k is 0.1 or less. On the other hand, in order to sufficiently reduce the variation in the output voltage Vout, the coupling coefficient k is preferably 0.03 or more and, more preferably, 0.05 or more.

Thus, when the inductor component 1 according to the present embodiment is used for the DC/DC converter 41 illustrated in FIG. 7, it is necessary for the coil conductors 10 and 20 to have the same polarity. For example, the leading ends 11a and 21a of the insertion parts 11 and 21 are used as input terminals, and the leading ends 12a and 22a of the insertion parts 12 and 22 are used as output terminals.

Figure 9:
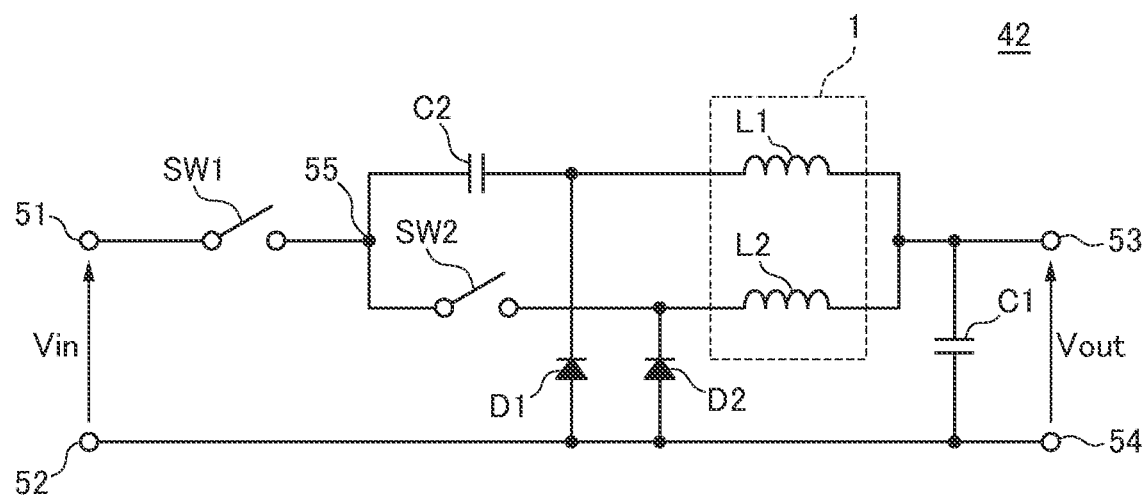
FIG. 9 is a circuit diagram of a DC/DC converter 42 as a second example using the inductor component 1.

FIG. 9 is a circuit diagram of a DC/DC converter 42 as a second example using the inductor component 1.

The DC/DC converter 42 illustrated in FIG. 9 has a pair of input terminals 51 and 52, a pair of output terminals 53 and 54, a switching transistor SW1 connected between the input terminal 51 and an intermediate terminal 55, a capacitor C2 and an inductor L1 connected in series in this order between the intermediate terminal 55 and the output terminal 53, a switching transistor SW2 and an inductor L2 connected in series in this order between the intermediate terminal 55 and the output terminal 53, and a capacitor C1 connected between the output terminals 53 and 54. A circuit composed of the capacitor C2 and inductor L1 and a circuit composed of the switching transistor SW2 and inductor L2 are connected in parallel between the intermediate terminal 55 and the output terminal 53. The input terminal 52 and output terminal 54 constitute a ground line. A diode D1 is connected in a backward direction between the connection point between the capacitor C2 and the inductor L1 and the ground line, and a diode D2 is connected in a backward direction between the connection point between the switching transistor SW2 and the inductor L2 and the ground line.

The switching transistors SW1 and SW2 are alternately turned ON and OFF by a not-shown control circuit to generate an output voltage Vout which is obtained by lowering an input voltage Vin. The switching transistors SW1 and SW2 can be controlled such that the output voltage Vout is 20% or less of the input voltage Vin.

The inductor component 1 according to the present embodiment is used in the thus configured DC/DC converter 42 as the inductors L1 and L2. For example, the coil conductor 10 constitutes the inductor L1, and the coil conductor 20 constitutes the inductor L2. This allows a reduction in the number of components constituting the DC/DC converter 42.

Figure 10:
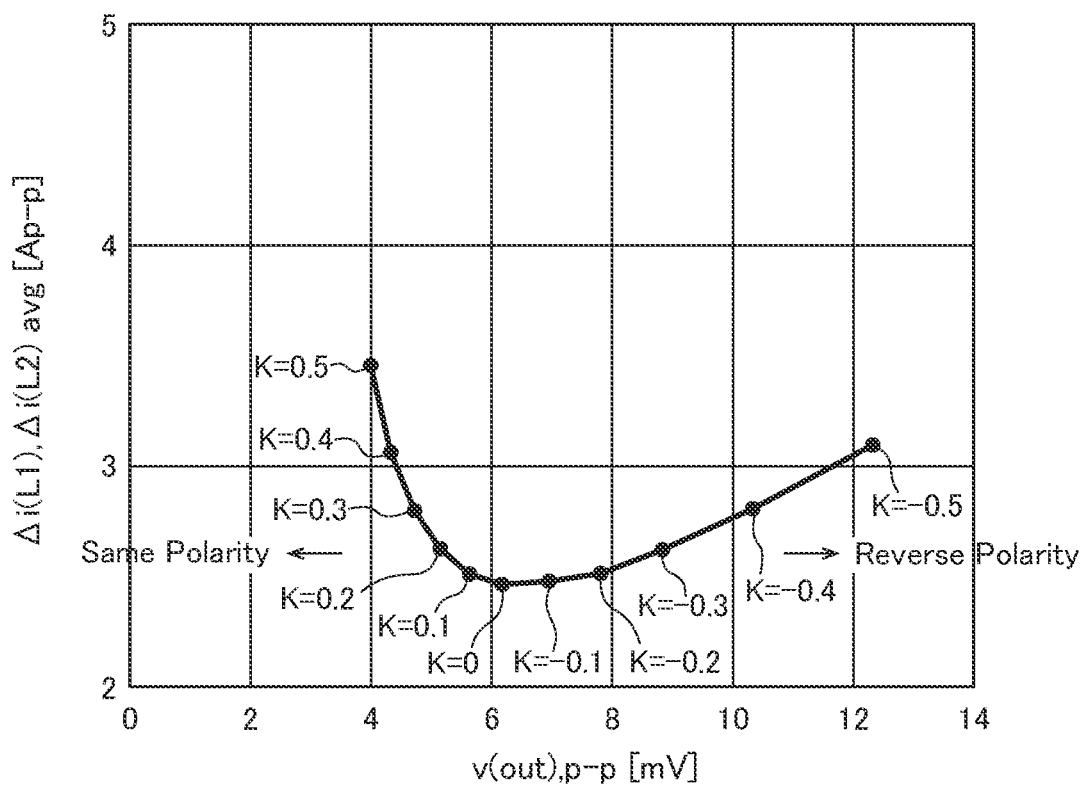
FIG. 10 is a graph illustrating the relation between parameters in the DC/DC converter 42, specifically, the coupling coefficient k between the coil conductors 10 and 20, a variation in the output voltage Vout, and ripple current flowing in the inductors L1 and L2.

FIG. 10 is a graph illustrating the relation between parameters in the DC/DC converter 42, specifically, the coupling coefficient k between the coil conductors 10 and 20, a variation in the output voltage Vout, and ripple current flowing in the inductors L1 and L2. Here, the output voltage Vout is set to 0.6 V, and the duty of the switching transistors SW1 and SW2 is set to 0.1. The variation in the output voltage Vout is a peak-to-peak value (mV). The value of the ripple current is an average value (Ap-p) between ripple current Δi (L1) flowing in the inductor L1 and ripple current Δi (L2) flowing in the inductor L2.

The graph of FIG. 10 reveals that the ripple current flowing in the inductors L1 and L2 becomes minimum when the coupling coefficient k is zero. However, the variation in the output voltage Vout decreases more when the coupling coefficient k increases in the positive direction than when the coupling coefficient k is zero. The ripple current increases when the coupling coefficient k increases in the positive direction, and an increase in the ripple current is sufficiently small when the coupling coefficient k is 0.2 or less and is substantially ignorable when the coupling coefficient k is 0.1 or less. On the other hand, in order to sufficiently reduce the variation in the output voltage Vout, the coupling coefficient k is preferably 0.03 or more and, more preferably, 0.05 or more.

Thus, when the inductor component 1 according to the present embodiment is used for the DC/DC converter 42 illustrated in FIG. 9, it is necessary for the coil conductors 10 and 20 to have the same polarity. For example, the leading ends 11a and 21a of the insertion parts 11 and 21 are used as input terminals, and the leading ends 12a and 22a of the insertion parts 12 and 22 are used as output terminals.

It is apparent that the present disclosure is not limited to the above embodiments, but may be modified and changed without departing from the scope and spirit of the disclosure.

As described above, an inductor component according to the present disclosure includes: a magnetic core having a plurality of magnetic thin ribbons extending in first and second directions perpendicular to each other and laminated in a third direction perpendicular to the first and second directions; a first coil conductor inserted into first and second through holes penetrating the magnetic core in the third direction; and a second coil conductor inserted into third and fourth through holes penetrating the magnetic core in the third direction. The first and second through holes are disposed symmetric with respect to a first center line passing, in the first direction, the center position of the magnetic core in the second direction. The third and fourth through holes are disposed symmetric with respect to the first center line. The first and third through holes are disposed symmetric with respect to a second center line passing, in the second direction, the center position of the magnetic core in the first direction. The second and fourth through holes are disposed symmetric with respect to the second center line. Each of the plurality of magnetic thin ribbons is divided into a plurality of small pieces by net-shaped cracks, and the periphery of each of the first to fourth through holes is surrounded by the plurality of small pieces without being circumferentially divided by a slit having a size larger than the crack.

According to the present disclosure, the magnetic core is formed by the magnetic thin ribbons each having the net-shaped cracks, eliminating the need to form a slit at the periphery of the through hole. This can reduce a decrease and a variation in the value of inductance due to the presence of the slit.

In the present disclosure, when the distance between the centers of the first and third through holes in the first direction is assumed to be b, and the width of the magnetic core in the second direction is assumed to be Wy, the value of b/Wy may be the range of 26% to 65%. Thus, when the first and second coil conductors have the same polarity, the coupling coefficient therebetween can be controlled in the range of 0.03 to 0.2. Further, the value of b/Wy may be in the range of 40% to 55%. Thus, when the first and second coil conductors have the same polarity, the coupling coefficient therebetween can be controlled in the range of 0.05 to 0.1.

In the present disclosure, when the distance between the centers of the first and second through holes in the second direction is assumed to be a, and the larger one of the width of the magnetic core in the first direction and that in the second direction is assumed to be W, the value of a/W may be in the range of 35% to 70%. This can maximize an inductance value to be obtained.

In the present disclosure, the magnetic thin ribbon may be made of an amorphous alloy or a nanocrystalline alloy. This can further increase the inductance value.

In the present disclosure, the average interval between the cracks may be in the range of 15 μm to 1 mm. This can prevent magnetic saturation while achieving a high inductance value.

A DC/DC converter according to an embodiment of the present disclosure has first and second circuits connected in parallel between an input terminal and an output terminal. The first circuit includes a first switching transistor and a first inductor which are connected in series. The second circuit includes a second switching transistor and a second inductor which are connected in series. The first and second inductors are constituted respectively by the first and second coil conductors of the above inductor component.

A DC/DC converter according to another embodiment of the present disclosure has a first switching transistor connected between an input terminal and an intermediate terminal and first and second circuits connected in parallel between the intermediate terminal and an output terminal. The first circuit includes a capacitor and a first inductor which are connected in series. The second circuit includes a second switching transistor and a second inductor which are connected in series. The first and second inductors are constituted respectively by the first and second coil conductors of the above inductor component.

According to the present disclosure, the two inductors used for the DC/DC converter can be achieved by one inductor component.

In the present disclosure, the first and second inductors may have the same polarity. This can reduce a variation in output voltage while reducing ripple current flowing in the first and second inductors.

In the present disclosure, the first and second switching transistors may be controlled such that an output voltage appearing at the output terminal is 20% or less of an input voltage supplied to the input terminal. This achieves a large step-down ratio.

As described above, according to the present disclosure, it is possible to reduce a decrease and a variation in the inductance value in an inductor component having two coil conductors inserted into through holes formed in a magnetic core. Further, according to the present disclosure, there can be provided a DC/DC converter using such an inductor component.

What is claimed is:
1. An inductor component comprising:
   a magnetic core having a plurality of magnetic thin ribbons extending in first and second directions per- pendicular to each other and laminated in a third direction perpendicular to the first and second directions;
a first coil conductor inserted into first and second through holes penetrating the magnetic core in the third direction; and
a second coil conductor inserted into third and fourth through holes penetrating the magnetic core in the third direction,
wherein the first and second through holes are disposed symmetric with respect to a first center line passing, in the first direction, a center position of the magnetic core in the second direction,
wherein the third and fourth through holes are disposed symmetric with respect to the first center line,
wherein the first and third through holes are disposed symmetric with respect to a second center line passing, in the second direction, a center position of the magnetic core in the first direction,
wherein the second and fourth through holes are disposed symmetric with respect to the second center line,
wherein each of the plurality of magnetic thin ribbons is divided into a plurality of small pieces by net-shaped cracks, and
wherein a periphery of each of the first to fourth through holes is surrounded by the plurality of small pieces without being circumferentially divided by a slit having a size larger than the crack.

2. The inductor component as claimed in claim 1, wherein when a distance between centers of the first and third through holes in the first direction is assumed to be b, and a width of the magnetic core in the second direction is assumed to be Wy, a value of b/Wy is a range of 26% to 65%.

3. The inductor component as claimed in claim 2, wherein the value of b/Wy is in a range of 40% to 55%.

4. The inductor component as claimed in claim 1, wherein when a distance between centers of the first and second through holes in the second direction is assumed to be a, and a larger one of a width of the magnetic core in the first direction and that in the second direction is assumed to be W, a value of a/W is in a range of 35% to 70%.

5. The inductor component as claimed in claim 1, wherein the magnetic thin ribbon is made of an amorphous alloy or a nanocrystalline alloy.

6. The inductor component as claimed in claim 1, wherein an average interval between the cracks is in a range of 15 μm to 1 mm.

7. A DC/DC converter comprising first and second circuits connected in parallel between an input terminal and an output terminal,
wherein the first circuit includes a first switching transistor and a first inductor which are connected in series,
wherein the second circuit includes a second switching transistor and a second inductor which are connected in series,
wherein the first and second inductors are constituted by an inductor component, the inductor component comprising:
a magnetic core having a plurality of magnetic thin ribbons extending in first and second directions perpendicular to each other and laminated in a third direction perpendicular to the first and second directions;
a first coil conductor inserted into first and second through holes penetrating the magnetic core in the third direction; and
a second coil conductor inserted into third and fourth through holes penetrating the magnetic core in the third direction,
wherein the first and second through holes are disposed symmetric with respect to a first center line passing, in the first direction, a center position of the magnetic core in the second direction,
wherein the third and fourth through holes are disposed symmetric with respect to the first center line,
wherein the first and third through holes are disposed symmetric with respect to a second center line passing, in the second direction, a center position of the magnetic core in the first direction,
wherein the second and fourth through holes are disposed symmetric with respect to the second center line,
wherein each of the plurality of magnetic thin ribbons is divided into a plurality of small pieces by net-shaped cracks,
wherein a periphery of each of the first to fourth through holes is surrounded by the plurality of small pieces without being circumferentially divided by a slit having a size larger than the crack, and
wherein the first and second inductors are constituted respectively by the first and second coil conductors of the inductor component.

8. A DC/DC converter comprising:
a first switching transistor connected between an input terminal and an intermediate terminal; and
first and second circuits connected in parallel between the intermediate terminal and an output terminal,
wherein the first circuit includes a capacitor and a first inductor which are connected in series,
wherein the second circuit includes a second switching transistor and a second inductor which are connected in series,
wherein the first and second inductors are constituted by an inductor component, the inductor component comprising:
a magnetic core having a plurality of magnetic thin ribbons extending in first and second directions perpendicular to each other and laminated in a third direction perpendicular to the first and second directions;
a first coil conductor inserted into first and second through holes penetrating the magnetic core in the third direction; and
a second coil conductor inserted into third and fourth through holes penetrating the magnetic core in the third direction,
wherein the first and second through holes are disposed symmetric with respect to a first center line passing, in the first direction, a center position of the magnetic core in the second direction,
wherein the third and fourth through holes are disposed symmetric with respect to the first center line,
wherein the first and third through holes are disposed symmetric with respect to a second center line passing, in the second direction, a center position of the magnetic core in the first direction,
wherein the second and fourth through holes are disposed symmetric with respect to the second center line,
wherein each of the plurality of magnetic thin ribbons is divided into a plurality of small pieces by net-shaped cracks,
wherein a periphery of each of the first to fourth through holes is surrounded by the plurality of small pieces without being circumferentially divided by a slit having a size larger than the crack, and wherein the first and second inductors are constituted respectively by the first and second coil conductors of the inductor component.

9. The DC/DC converter as claimed in claim 7, wherein the first and second inductors have a same polarity.

10. The DC/DC converter as claimed in claim 7, wherein the first and second switching transistors are controlled such that an output voltage appearing at the output terminal is 20% or less of an input voltage supplied to the input terminal.

11. The DC/DC converter as claimed in claim 8, wherein the first and second inductors have a same polarity.

12. The DC/DC converter as claimed in claim 8, wherein the first and second switching transistors are controlled such that an output voltage appearing at the output terminal is 20% or less of an input voltage supplied to the input terminal.

* * * * *